United States Patent [19]

Flora-Holmquist et al.

[11] Patent Number: 5,459,841
[45] Date of Patent: Oct. 17, 1995

[54] FINITE STATE MACHINE WITH MINIMIZED VECTOR PROCESSING

[75] Inventors: Alan R. Flora-Holmquist, Batavia; James D. O'Grady, Aurora, both of Ill.

[73] Assignee: AT&T Corp., Murray Hill, N.J.

[21] Appl. No.: 174,642

[22] Filed: Dec. 28, 1993

[51] Int. Cl.[6] ........................................ G06F 9/30
[52] U.S. Cl. ........................................ 395/375; 395/800
[58] Field of Search .................... 395/375, 775, 395/800; 364/715, 769

[56] References Cited

U.S. PATENT DOCUMENTS

| | | | |
|---|---|---|---|
| 4,101,967 | 7/1978 | Hajduk | 395/800 |
| 4,212,076 | 7/1980 | Conners | 364/706 |
| 4,399,377 | 8/1983 | Jones | 307/465 |
| 5,245,339 | 9/1993 | Cideciyan | 341/95 |
| 5,300,931 | 4/1994 | Lindsay et al. | 341/106 |
| 5,301,100 | 4/1994 | Wagner | 364/148 |
| 5,317,757 | 5/1994 | Medicke et al. | 395/800 |

Primary Examiner—Parshotam S. Lall
Assistant Examiner—Viet Vu
Attorney, Agent, or Firm—Charles L. Warren

[57] ABSTRACT

Conventional AND vectors are compared to corresponding input vectors of the same length as part of the logic processing associated with the finite state machine. AND vectors having a single set bit are translated into AND index vectors in which the bit position of the single set bit is encoded. AND index vectors are also identified by an index flag. The encoded bit position is utilized to identify the corresponding bit position in the input vector to perform a TRUE/FALSE test to determine an overall TRUE or FALSE indication. This technique avoids a bit by bit comparison for AND vectors having a single set bit.

8 Claims, 11 Drawing Sheets

FIG. 5
(PRIOR ART)

| STATE | NEXT STATE | CONDITION | ACTION |
|---|---|---|---|
| STATE_ON | STATE_OFF | CMD_OFF | ENTRY ACTION<br>MOTOR_ON<br>START_TIMER |
| STATE_ON | STATE_IDLE | DOOR_CLOSED AND MOTOR_OK OR TEMP_HIGH AND WAT_LOW AND WAT_ENA OR TIMEOUT | |
| STATE_ON | STATE_ERROR | DOOR_OPEN AND TEMP_HIGH OR DOOR_OPEN AND WAT_LOW AND WAT_ENA | EXIT ACTION<br>STOP_TIMER |
| STATE_ON | | TIMEOUT OR<br>WAT_LOW AND WAT_ENA | INPUT ACTION<br>ALARM_MOTOR_NOT_OK |
| | | TEMP_HIGH AND DOOR_OPEN | INPUT ACTION<br>ALARM_TEMP_HIGH |
| | | DOOR_OPEN AND MOTOR_OK | INPUT ACTION<br>ALARM_DOOR_OPEN<br>MOTOR_OFF |

APPLICATION LOGIC TABLE

"AND" SPECIFICATION

"AND" SPECIFICATION

"AND" INDEX

FINITE STATE MACHINE WITH MINIMIZED VECTOR PROCESSING

BACKGROUND OF THE INVENTION

This invention is generally directed to finite state machines implemented in a microprocessor having memory in which logical expressions are stored. This invention is specifically direct to such an implementation wherein specially identified logical vectors are stored in an index format to minimize the execution time required to compare the indexed vector with another vector.

As used herein, a finite state machine refers to a sequential system in which input parameters determine the state of operation of the machine. An implementation of a finite state machine is described in U.S. Pat. No. 5,301,100, entitled "Method of an Apparatus for Constructing a Control System and Control System Created Thereby", filed Apr. 27, 1991. This Patent describes a logic table for implementing the finite state machine in which a specific organization of data represents application logic conditions expressed utilizing logical AND and OR operators. FIGS. 1–7 in the present application describe aspects of such a prior art finite state machine implementation. FIG. 4 of the present application illustrates a finite state machine model as contemplated by this prior art.

In the finite state machine model, in accordance with the above-referenced prior art, a change of input parameters is required following a change of state transition before a test is made to determine if output actions are required in response to predetermined input parameter conditions. In certain applications it is desirable to be able to process such input conditions although a change in input parameters has not occurred since the change of state. One way of inducing such input parameter testing is to utilize an additional input parameter not related to the sinced input parameters which can be toggled solely to cause a reevaluation of input parameters. Such an input can be considered a "kicker" in order to initiate an action by the prior art finite state machine. The use of such an input kicker is undesirable in that it adds to the number of inputs and must be initiated at an appropriate time relative to the state of the finite state machine in order to be effective. Thus, there exists a need for an improved finite state machine model which overcomes the afore-referenced deficiency.

In the finite state machine model in accordance with the above-referenced prior art, a plurality of "AND" vectors are stored in an application logic table and define the processing steps implemented by the general flow of the state machine. Input parameters are represented by an input vector having a given bit length. The AND vectors are each of the same length as the input vector and are compared with the input vector on a bit-by-bit basis to make logical determinations in accordance with the state machine.

For a number of applications, the AND vectors of the prior art implementation consist of a single set bit. Thus, the combination of all other bits in such an AND vector with the input vector are unnecessary in that such comparisons can not yield a TRUE result. The comparison with AND vectors with the input vector on a bit-by-bit basis requires a number of execution cycles. Thus, there exists a need to enhance the execution speed by minimizing unnecessary bit-by-bit comparisons.

SUMMARY OF THE INVENTION

It is an object of the present invention to provide an improved finite state machine implementation which permits certain AND vectors to be compared with an input vector without requiring a bit-by-bit comparison.

In accordance with an embodiment of the present invention, a process control apparatus includes a microcomputer which implements a finite state machine having a plurality of possible states. An input register receives input signals in which signals represent a condition associated with a process monitored by the finite state machine. An application table stores sets of conditions in memory as AND vectors which are compared against the input vector defined by the input register. AND vectors having a single set bit are identified and translated into a corresponding AND index vector in which the bit position having the set bit is encoded. The AND index also includes an index flag identifying the vector as an AND index vector as opposed to a normal full length AND vector. The AND index vector replaces the corresponding AND vector from which it was derived. During the execution of the finite state machine, a determination is made if a vector is an AND index vector based on the index flag. If a vector is determined to be an AND index vector, the stored bit position contained in the AND index vector is decoded and utilized to identify a corresponding bit position in the input vector, and a TRUE/FALSE determination is made of the identified bit in the input vector. This completes the equivalent comparison of the index vector with the input vector. Thus, it will be apparent that a bit-by-bit comparison is eliminated and thereby execution speed is increased.

BRIEF DESCRIPTION OF THE DRAWINGS

FIG. 5 is a table illustrating an example of a prior art transition table for a finite state machine.

DESCRIPTION OF A PRIOR ART FINITE STATE MACHINE

Figure 1:
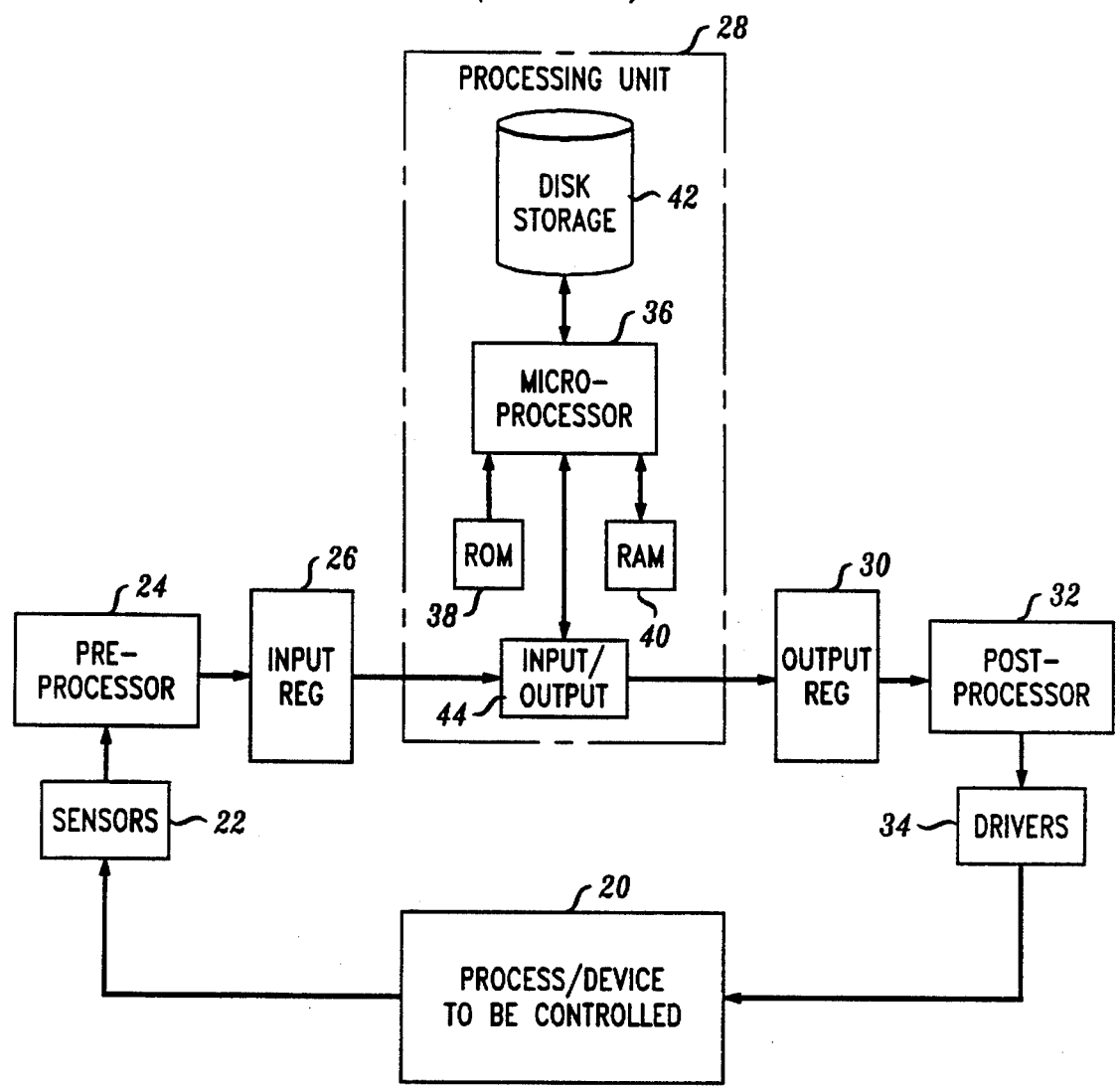
FIG. 1 is a block diagram of a control system which uses a finite state machine implemented in a microcomputer system.

A description of a prior art finite state machine is provided in order to provide a basis for understanding and appreciating the advantages of the finite state machine in accordance with the present invention. For a more complete explanation of the virtual finite state machine described herein as the prior art finite state machine, reference should be made to U.S. Pat. No. 5,301,100, entitled "Method Of An Apparatus For Constructing A Control System and Control System Created Thereby", filed Apr. 27, 1991. FIG. 1 shows a general architecture that applied to both the prior art finite state machine and the finite state machine in accordance with the present invention. FIGS. 2–7, 13, and 14 are illustrations which relate to the prior art finite state machine.

FIG. 1 illustrates an architecture for implementation of a finite state machine which controls a process or device 20. The actions of a machine such as used for manufacturing or a process having controllable steps are contemplated as being controllable as item 20. A plurality of sensors 22 convert parameters associated with device 20 into conventional electrical signals. The electrical outputs of sensors 22 provide inputs to preprocessor 24 which is described in more detail in FIG. 2. The preprocessor 24 provides a plurality of outputs each of which is preferably represented as a binary state to which a unique name is assigned describing the function represented by the state. The preprocessor outputs are received by an input register 26 which in the illustrative example comprises an N×1 vector in which each bit represents the state of an input received from preprocessor 24. The processing unit 28 stores the states of the bits of input register 26 as an input vector and makes logical determinations based on comparisons of "AND" vectors to the input vector. The processing unit operates under stored program instructions and operates in accordance with the flow diagram as shown in FIG. 4. The output of processing unit 28 is an output vector consisting of a series of bits each representing a state in an M×1 output vector that is stored in output register 30. Each bit in the register represents an output control element represented by an output name. Each output name corresponds with an action associated with device 20. A post-processor 32 which is further described in FIG. 3 receives the binary outputs from output register 30. The general function of the post-processor 32 is to convert the binary states into appropriate electrical signals which are further converted by drivers 34 which provide control signals to drive device 20. The drivers 34 may represent relays, buffers, or other electrical devices or may represent a conversion from electrical signals to mechanical or other types of controls required by device 20. An advantage associated with this type state machine resides in the separation of the input and output functions from the application process control carried out by processing unit 28. Further, the assignment of input names and output names relative to the states associated with input register 26 and output register 30, respectively, facilitates an understanding of the state machine implementation which simplifies debugging and modifications after the original design.

The processing unit 28 in the illustrative embodiment includes a microprocessor 36 which is supported by read-only memory (ROM) 38, random access memory (RAM) 40 and a disk storage device 42 such as a hard disk drive. An input/output peripheral 44 is connected to microprocessor 36 and assists in receiving inputs from input register 26 and writing outputs to output register 30. In the exemplary embodiment, ROM 38 includes start-up initialization control for microprocessor 36 which functions to implement stored program control instructions such as stored in disk storage 42 for execution in memory locations within RAM 40. The memory in RAM 40 contains the input vector, output vector, AND vectors, predetermined state information for each state, and program instructions that implement the operation of the finite state machine.

Figure 2:
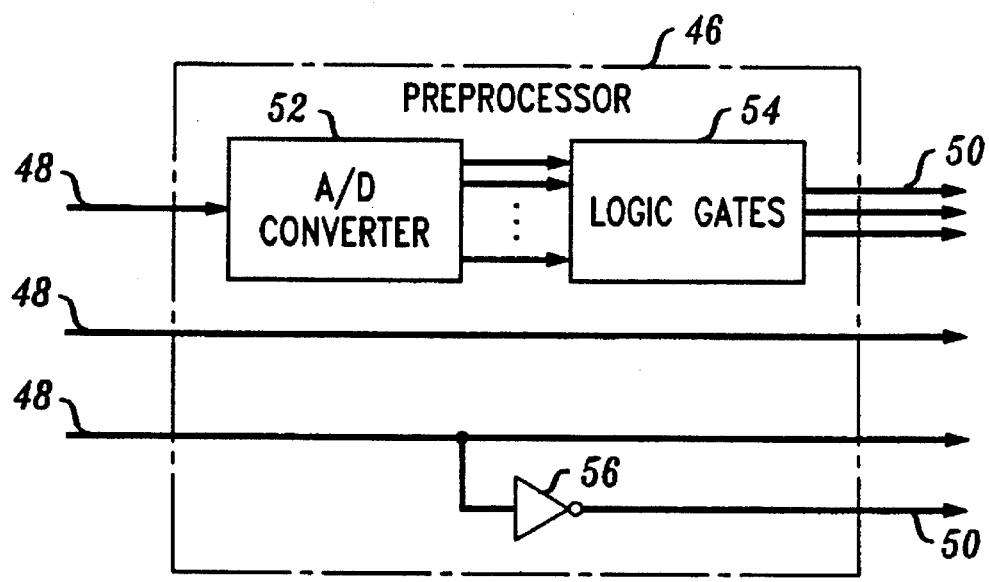
FIG. 2 is block diagram of a preprocessor as shown in FIG. 1.

FIG. 2 illustrates an exemplary embodiment of the preprocessor 46 which receives inputs 48 from sensors 22 and provides outputs 50 to input register 26. It will be understood that the specific nature of the preprocessor will depend upon the particular device 20 being controlled and the number of input names or states which are required for the control function. In the illustrative example, an analog-to-digital (A/D) converter 52 receives an analog input and converts it to a corresponding set of digital outputs which are provided to logic gates 54. These gates may consist of conventional logic gates configured to provide desired binary state outputs 50. The design of the logic gates is dependent upon the particular application and the required functions which must be monitored by inputs to input register 26. A digital input 48 having an appropriate busy state may require no buffering by preprocessor 46 or may require a simple inversion such as by an inverter gate 56. Each output 50 controls a single stage (bit) in input register 26 and defines a binary state representative of a parameter associated with device 20.

Figure 3:
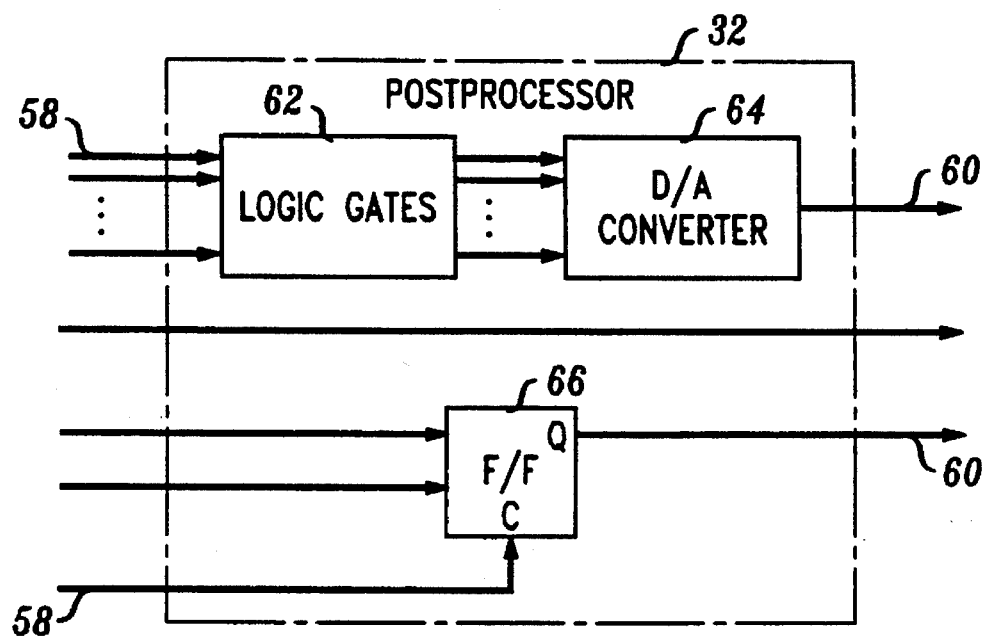
FIG. 3 is a block diagram of a post-processor as shown in FIG. 1.
Figure 4:
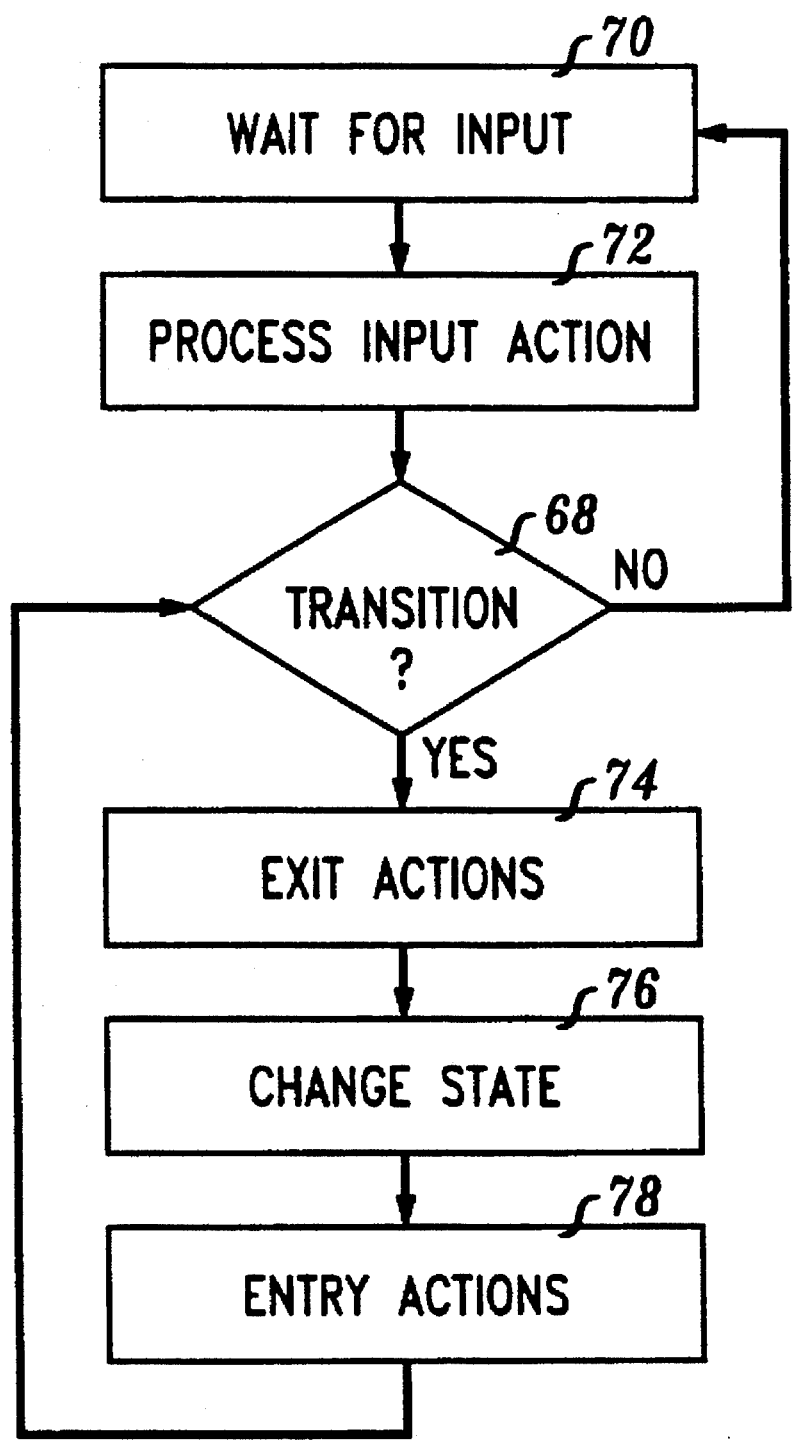
FIG. 4 is a flowchart showing the operation of a prior art finite state machine.

FIG. 3 illustrates an exemplary embodiment of a post-processor 32 which receives inputs 58 representing binary states from output register 30 and provides outputs 60 which are coupled to drivers 34. The general purpose of post-processor 32 is to convert the binary states defined in output register 30 into appropriate commands which are interpreted by drivers 34 to apply command or stimulus to device 20. In the illustrative example, logic gates 62 represent a series of conventional logic gates which are designed dependent upon the application. The outputs from logic gates 62 are convened by a digital-to-analog (D/A) converter 64 into an analog output signal provided as an input to drivers 34. Such an analog signal may be utilized by the drivers to provide an analog input parameter control such as to control the speed of a motor. As illustrated in FIG. 3, an input may be directly coupled to provide an output to a driver. For example, an ON/OFF command signal may be coupled by drivers 34 to device 20 to control a basic ON/OFF function. Other inputs 58 to post-processor 32 are coupled to a flip-flop 66 which provides an output 60 to drivers 34. The flip-flop may be utilized to provide state dependent or timing control signals to drivers 34 dependent upon the particular application and device 20.

FIG. 4 illustrates a flow diagram of the above-referenced, prior art, finite state machine in which processing unit 28 operates to perform three types of actions: input actions, exit actions, and entry actions. Assume that the illustrative example of the finite state machine is in a steady state condition indicated by step 68 which makes a determination as to whether a state transition is to be made. Assuming no state transition is to be made, step 70 waits for a change of input as indicated by the change of state of one of the bits in the input vector derived from input register 26. Upon recognizing a change of input, the process input action step 72 is initiated. The input action processing consists of the application of a plurality of input specification words (AND vectors) which are ANDed with the input vector to make a determination of whether the output vector should be changed due to the change of input. This input action is initiated without regard to whether a change of state of the state machine will be later initiated. Following the input action processing by step 72, step 68 again considers whether a state transition is to occur. The state transition determination is also made by ANDing a set of state transition words (AND vectors) with the input vector. Assume for purposes of this example, that a state transition is indicated, i.e. a YES determination is made by the state transition step 68. For each state there exists a predefined exit action stored as an exit vector as indicated by step 74 which is to be taken prior to leaving the current state. The exit action consists of writing the corresponding exit vector to output register 30. In step 76 a change of state occurs from the current operating state to another state as defined by next state vectors stored in the current state for each other state to which a transition is allowed. Upon entering the new state, stored entry actions 78 are executed. The entry actions consist of an entry vector which is written to output register 30 and hence, define the output commands to be utilized by post-processor 32. The entry actions provide an initialization of the outputs of output register 30 upon entry to the new state. Following the entry actions, if any, control again passes to the state transition determination step 68. The state transition test made by ANDing AND vectors with the input vector will again determine whether another state transition is to be made. If an immediate transition is not to be made based on such a test, control passes to the wait-for-input step 70 before any further action can occur. Each state contains predetermined exit actions to be executed upon leaving the state and entry actions to be executed upon entry to the state. One set of AND vectors defines when an input action is enabled to write an associated vector to the output register 30; another set of AND vectors defines when a transition to another state is to occur.

An example of the application of the prior art finite state machine involves the control of a device 20 which consists of a motor and parameters associated with the motor. The motor is enclosed in a cabinet having a door which can be open or closed. The motor is water-cooled and has sensors which sense whether the flow of water is enabled or disabled, and also sensors which sense whether the water level is high or low. A temperature sensor senses if the temperature is within a predetermined operating range, high or low, i.e. above or below the operating range. Command signals of OFF, ON and IDLE are used to control the motor. A timer is associated with the motor to measure elapsed time of operation for maintenance purposes and provides a timeout input indicating a predetermined time has elapsed.

The table below defines input names associated with a binary state of a bit in input register 26 for corresponding input events.

TABLE 1

| EVENT | INPUT NAME |
|---|---|
| Timer Elapsed | Timeout |
| Door Closed | door_closed |
| Door Open | door_open |
| Water Low | wat_low |
| Water Not Low | wat_high |
| Temperature within Range | temp_in |
| Temperature above Range | temp_high |
| Temperature below Range | temp_low |
| Motor On | cmd_on |
| Motor off | cmd_off |
| Motor Idle | cmd_idle |
| Water Control On | wat_ena |
| Water Control Off | wat_dis |
| Motor Operation Okay | motor_ok |

FIG. 5 illustrates a transition table 80 in accordance with the above-defined application of the prior art finite state machine. This transition table 80 defines input actions, entry actions, and exit actions to be taken relative to the state of "state_on". Column 82 indicates the state for this table, i.e. state_on. Column 84 identifies three other states to which a transition can be made, i.e. state_off, state_idle, and state_error. Column 86 defines conditions consisting of input conditions or logical combinations of input conditions which can cause transitions to the respective next states or cause input actions to occur. Column 88 defines actions which occur for the corresponding conditions. Row 90 defines the conditions (cmd_off) which will cause a transition to the state_off. Row 92 defines that any one of three sets of ANDed conditions can cause a transition to the state_idle. Row 94 illustrates that two sets of ANDed conditions can cause a transition to state_error. It will be noted that for each of rows 90, 92, and 94 that the same exit action is taken upon exiting the ON state and that the same entry action would be taken upon entering the ON state. Row 96 consists of separate sets of ANDed conditions which result in the indicated corresponding input actions. It should be noted that these "input actions" actually cause a stored vector to be written to output register 30 and hence, control the output. The output names associated with the output register 30 are self-explanatory of corresponding events or alarms to be controlled.

Table 80 represents a particular set of conditions for the state of state_on which were designed based upon the control of a particular system. It will be understood by those skilled in the an that a corresponding table will exist for each of the possible states in order to define a complete operation sequence of the state machine control for the entire application. These states will depend upon desired actions and occurrences based on input parameters and will, like table 80, define conditions causing transitions to other states and conditions which result in output parameter changes which can be initiated by entry actions, exit actions or input actions.

Figure 6:
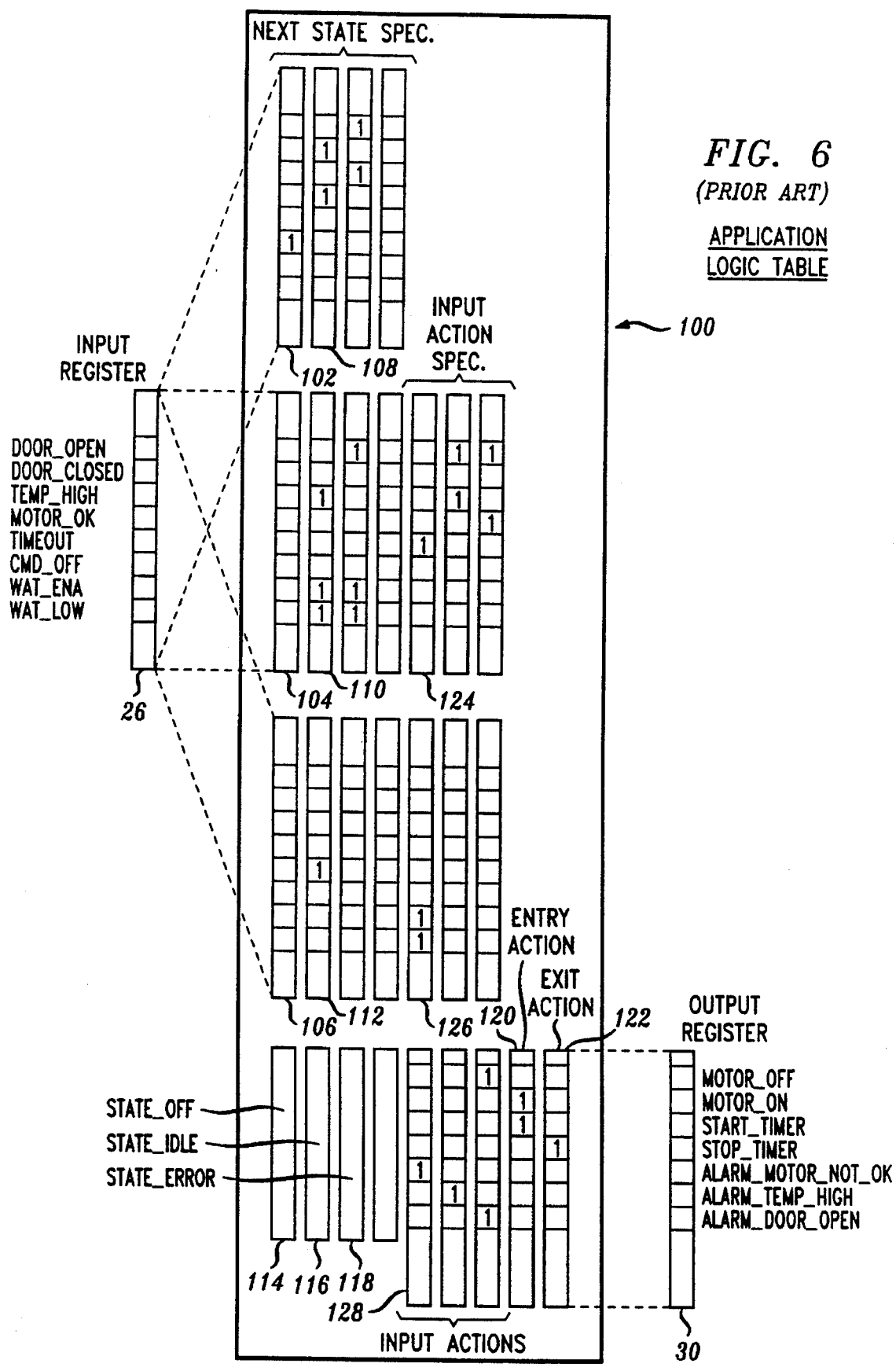
FIG. 6 illustrates an application logic table based on the example described in FIG. 5 which is stored in memory.

FIG. 6 illustrates an application logic table 100 implemented by processing unit 28 in accordance with the example as shown in FIG. 5. The input register 26 uses an 8×1 bit register in which each bit represents a TRUE or FALSE state of the named input parameters. A set of next state specifications (AND vectors) consists of separate 8×1 bit words which are ANDed with an input vector represented by the input register word in accordance with the conditions defined in column 86, rows 90, 92, and 94, of table 80. For example, a transition to the state of state_off is satisfied if (vector 102, AND input register 26) OR (vector 104 AND input register 26) OR (vector 106 AND input register 26) is TRUE. It will be noted that input vector 104 and 106 are blank indicating that only a single condition specified by vector 102 determines a transition to state_off, i.e. if the cmd_off condition is met. The blank vectors 104 and 106 occur because three ORed sets of ANDed conditions exist to determine the transition to state_idle, i.e. vectors 108, 110, and 112 which correspond to the conditions in row 92, column 86 of table 80. In accordance with the application table of the prior art finite state machine, the same number of next state AND vectors are assigned for each possible transition state. Thus, certain of the vectors appear blank since not all transition conditions require three separate sets of conditions which must be tested. The fourth column in the next state specification set of AND vectors is blank; it is believed this represents the current state_on which would be utilized in other application logic tables in which a transition could be made to the state_on. The ANDing of the sets of next state vectors with the input register vector illustrates the transition determination step 86 of the flow diagram illustrated in FIG. 4. Thus, if one of any of the three vectors ANDed with the input register is TRUE, a transition to that state will be initiated in accordance with the flow diagram. State vectors 114, 116, and 118 define address locations of corresponding application logic tables in memory of the processing unit 28. An entry action vector 120 defines actions transmitted to output register 30 upon entry into the state_on and exit action vector 122 defines actions to be transmitted to output register 30 upon exiting from state_on to another state.

The input actions specification vectors as shown in application logic table 100 (2 rows by 3 columns) define 8×1 bit vectors which are ANDed with the input register vector to determine if a corresponding input action vector shown in horizontal alignment with output register 30 in FIG. 6 is to be executed. For example, vector 124 when ANDed with input register vector tests if the timeout condition exists. Likewise, input action vector 126 determines if the water is low and water control is enabled when ANDed with the input register vector. If either vector 124 or 126 is TRUE when ANDed relative to input register vector, then the action defined by vector 128 is transferred to output register 30, i.e. the alarm_motor_not_ok bit is set. This condition corresponds with the first set of conditions identified in row 96 of column 86 and the corresponding input action indicated in column 88. Similar to the next state specifications, it will be noted that certain of the input action vectors are blank which similarly represents that not all of the input actions require two conditions which are to be ANDed with the input register, i.e. some of the input conditions are defined by a single set of conditions which can be represented by a single 8×1 bit vector. The execution of the ANDing of the input action vectors and input register vector comprises the process input action step 72.

The 7×1 bit vectors shown in horizontal alignment with output register 30 define the states of the corresponding output parameters. Only one of these sets of output parameters can be reflected while in the state_on. To provide other output parameters, a transition must be made to another state. It will be understood by those skilled in the art that more complex representations of control systems would require more than the monitoring of eight input parameters. Thus, the length of the next state vectors and input action vectors which are to be ANDed with the input register vector would also be increased to reflect the same corresponding length. Each of the vectors shown in application logic table 100 is represented by a word in a memory location in RAM 40 of processing unit 28. In accordance with the operating instructions shown in the flow diagram of FIG. 4, sets of these vectors are tested for a TRUE condition relative to the input register vector to determine if an input action process is required (see step 72) or if a state transition is required (see step 68).

Figure 7:
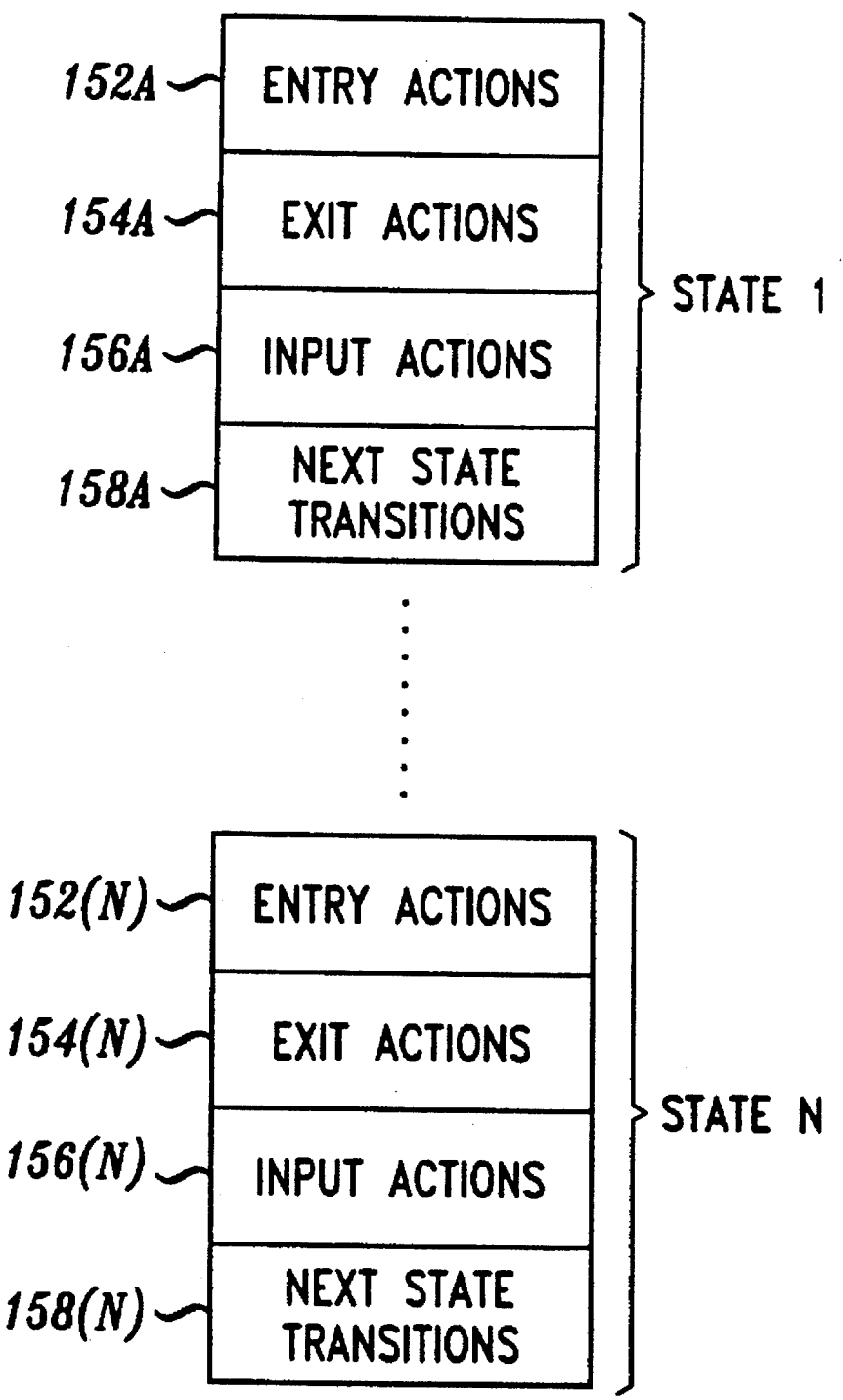
FIG. 7 is a pictorial representation of the implementation in memory of the prior art finite state machine.

FIG. 7 provides a pictorial representation of the implementation of the prior art finite state machine in memory of a microcomputer. For each possible state defined for the state machine, a corresponding set of definitions is required in order to provide the required system control. Each of the states may be visually depicted as representing separate application logic tables 100 such as shown in FIG. 6. In the illustration of state 1 in accordance with FIG. 7, entry actions 152A and exit actions 154A represent corresponding vectors that are written to the output register upon a change of state. Input actions 156A consists of a set of predetermined AND vectors which are utilized to write corresponding vectors to the output register vector if an AND vector is TRUE. The next state transitions 158A correspond to the next state AND vectors in the application logic table which define if a state transition is to be made. State N represents the last defined state for the illustrative prior art finite state machine which includes similar representative elements designated by the suffix "N". Each of states 1-N utilize substantially identical portions of memory, i.e. size and organization.

DESCRIPTION OF PREFERRED EMBODIMENTS OF THE PRESENT INVENTION

Figure 8:
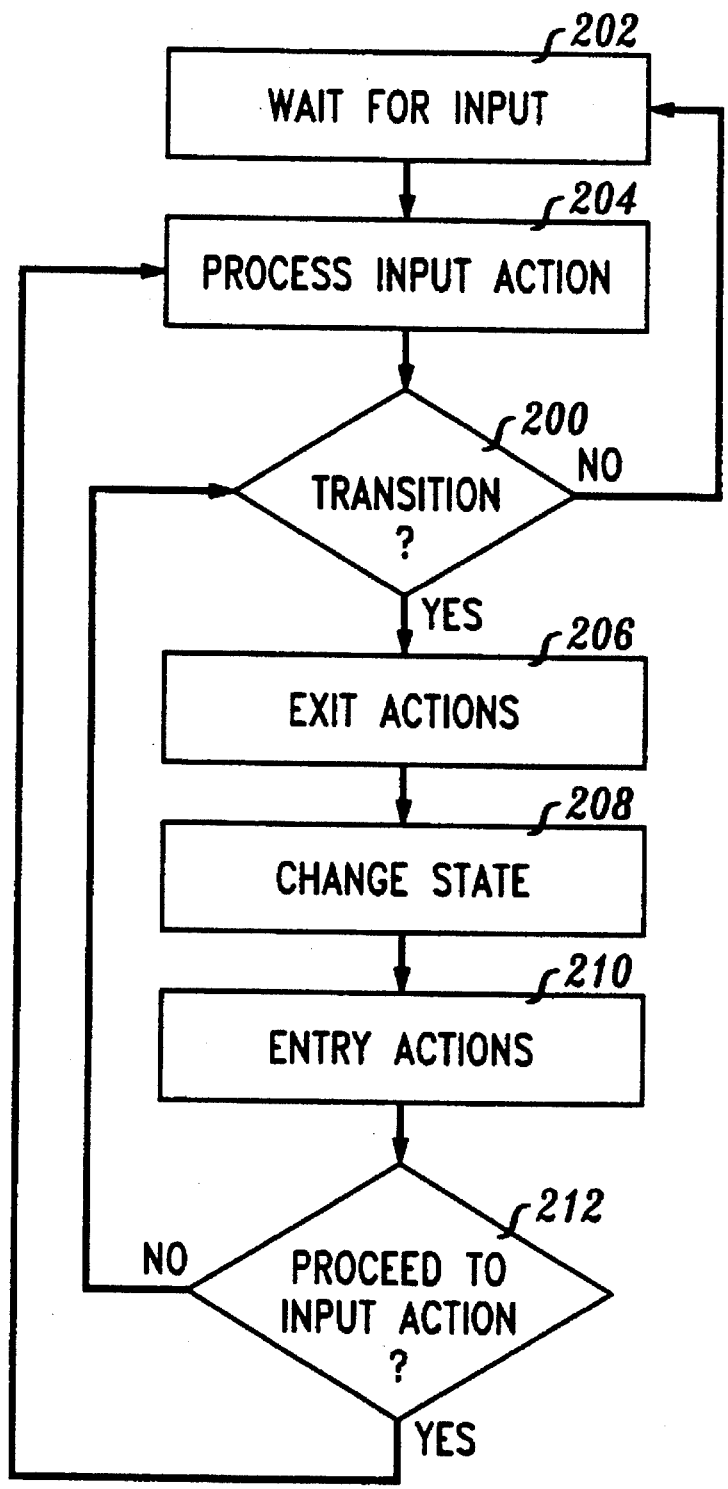
FIG. 8 is a flow diagram showing the operation of the finite state machine in accordance with the present invention.

FIG. 8 illustrates a flowchart for a finite state machine in accordance with the present invention. Step 200 is a state transition determination. Assuming a state transition is not to be made, control proceeds to a wait-for-input step 202 in which the status of an input register is monitored for a change of condition. In step 204 a processing input action is initiated to determine if a new output register vector is to be initiated. Following the processing of the input action, control passes to determination step 200 for a change of state determination. Upon a YES determination by step 200, an exit action as indicated by step 206 is initiated before leaving the current state. Then, a change of state to the state determined by the state transition test in step 200 is initiated. Upon entry into the new state, a predetermined entry action is executed as determined by step 210. After the execution of the entry action in the new state, a determination is made by step 212 of whether to proceed to the input action. A YES determination results in a direct transition to process input action step 204 in which the input actions are tested for possible action. A NO decision by step 212 causes the process to return to the state transition determination step 200 which makes a determination as to whether a change of state is to be initiated. The determination by step 212 of whether to proceed to an input action is made based on a proceed flag which is stored for each possible state. If the flag is set, step 212 effects a YES determination; if not set, step 212 makes a NO determination.

Step 212 and the corresponding proceed flag which controls the decision process of the step provide an improved control mechanism relative to the prior art finite state machine model as illustrated in FIG. 4. In a number of applications it is desirable to be able to directly test whether an input action is to be initiated following a change of state transition. In the prior art implementation an input change was required before consideration of testing for input action would be initiated. Such a requirement could lead, in many applications, to the use of an additional nonprocess related input utilized solely to "kick" step 202 by causing a change of input state of a kick input in order to initiate the process input action step. The improved arrangement in accordance with the present invention as shown in FIG. 8 eliminates such artificial control and provides the designer with control of whether a test of input action is immediately desirable following a state transition. Such control provides for more efficient operation in many applications and eliminates the need to implement a nonfunctional kick input. The use of a flag for each state to control the decision of step 212 provides advantageous control of the flow processing in accordance with FIG. 8.

Figure 9:
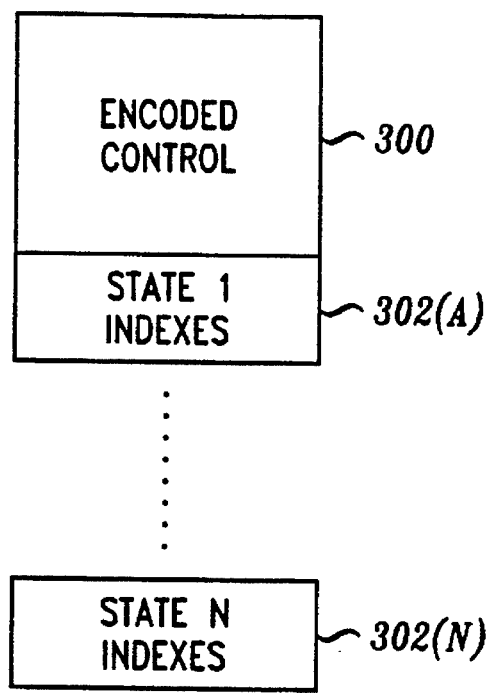
FIG. 9 is a pictorial representation of the implementation in memory of the finite state machine described in accordance with FIG. 8.

FIG. 9 illustrates an improved coding implementation of a finite state machine in accordance with the present invention. This figure provides a visual representation of an encoding scheme in which the use of memory is minimized to implement the finite state machine of the present invention. An encoded control section 300 represents the storage of non-blank vectors in a generally contiguous format for all of the states of the finite state machine. This differs from the prior art implementation, wherein entry actions, exit actions, input actions, and next state transition specifications used a predetermined format and occupied a fixed amount of memory for each state. In accordance with the present invention, the size of data structures (vectors) associated with the actions is not fixed and hence, does not require the utilization of vectors which are blank, i.e. contain no useful coding information. State indexes 302(A)–302(N) provide an index for each possible state of the finite state machine in accordance with the present invention. These indexes provide information concerning the determination of actions for each state which will be further described with regard to FIG. 10.

Contrasting the implementation of the present invention with that of the prior art, next state vectors 104 and 106 in FIG. 6 of the prior art implementation occupy memory even though they are blank because the fixed size constraint for the next state vectors requires the maximum number of vectors allocated for a state be allocated for each set of next state vectors. In accordance with the present invention, such unused specification vectors 104 and 106 will not be utilized, i.e. no memory will be allocated for such blank vectors. The implementation in accord with the present invention also eliminates any blank vectors which would have occurred in the prior art for input action vectors. Thus, the blank input vectors as seen in FIG. 6 associated with the prior art implementation would not have memory allocated in the implementation in accordance with the present invention. An explanation of the encoded implementation of the present invention is described in more detail with regard to FIGS. 10–12.

Figure 10:
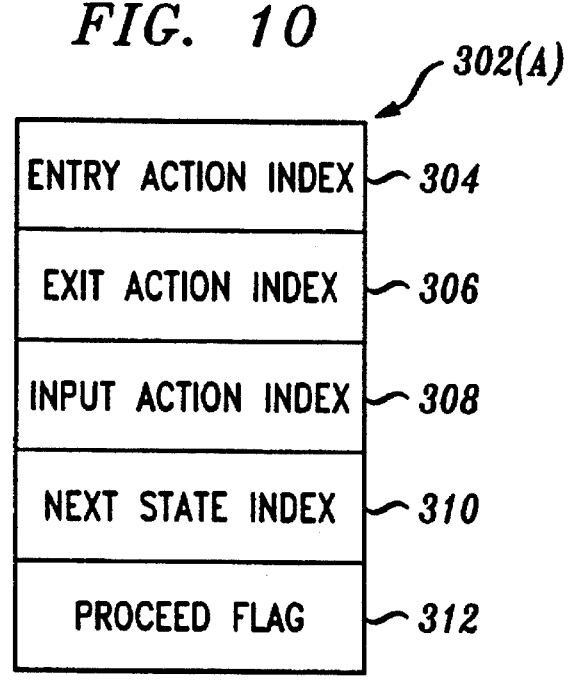
FIG. 10 is a pictorial representation showing an exemplary set of indexes for a state as shown in FIG. 9.

FIG. 10 illustrates a set of indexes 302(A) which is representative of sets of indexes stored for each state of the state machine. Entry action index 304 and exit action index 306 are address pointers which identify memory storage locations in encoded control 300 which contain a corresponding entry action vector and exit action vector which are to be executed. Input action index 308 and next state index 310 each consist of an address pointer to a memory location in the encoded control 300 which identifies the beginning address of information stored for the input actions and next state transitions, respectively. An explanation of the storage of the next state information associated with next state index 310 and input action information associated with input action index 308 is provided relative to FIG. 11 and FIG. 12, respectively. The proceed flag 312 is accessed by step 212 in accordance with the flow diagram of FIG. 8. If this flag is set, step 212 initiates a YES transition indicating that input action processing should immediately occur. If the flag is not set, step 212 initiates a NO decision returning control to the state transition decision of step 200. This proceed flag is set by the application designer for each state in order to provide for control flexibility.

In accordance with the present invention, a further advantage is provided in that a predetermined null value can be assigned to the indexes 304, 306, 308 or 310 to represent a condition in which no further processing is required. For example, the predetermined null value may consist of a word consisting of the number zero. The corresponding index (302(A)–302(N)) is referenced in accordance with the flow control illustrated in FIG. 8 in order to obtain a location reference in the encoded control memory area to specific vectors to be utilized for the corresponding actions. For example, the process input action step 204 would reference input action index 308; state transition determination step 200 would reference next state index 310; exit action step 206 would reference exit action index 306; and entry action step 210 would reference entry action index 304. The proceed-to-input-action step 212 references the proceed flag 312. Thus, for each of the tests and actions required in accordance with the flow as defined in FIG. 8, a corresponding index exists to locate corresponding encoded vector data stored in encoded control section 300 in memory.

Upon referencing indexes 304–310, a test is made to determine if the corresponding index contains the predetermined null value. If the index contains the predetermined null value, this provides an indication that no further processing is required to complete the action or test, and that no corresponding memory is allocated in encoded control section 300. For example, if no entry action processing is required upon the entry into a given state, the corresponding entry action index 304 for that state is encoded with the predetermined null value, thereby eliminating the need to store an entry action vector which would be blank and eliminating the time required to process the blank vector. The predetermined null value is interpreted as a command to proceed to the next step in accordance with the flowchart of FIG. 8. Thus, the utilization of the predetermined null value eliminates the allocation of memory for corresponding blank vectors and increases the speed of the implementation of the finite state machine in accordance with the present invention by eliminating the processing of vectors which will produce no meaningful results or changes.

Figure 11:
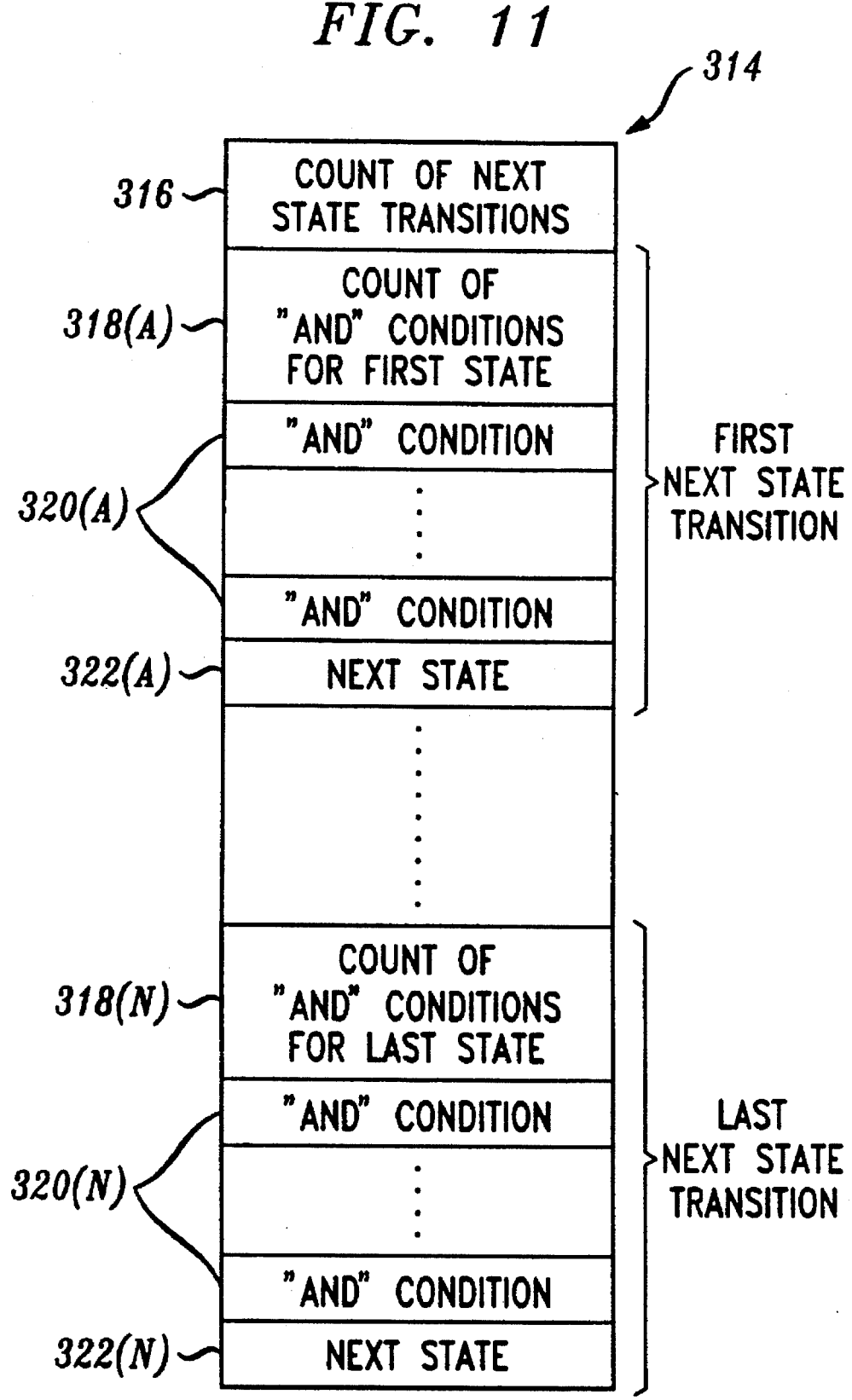
FIG. 11 is a table representative of memory storage of next state transition logic pointed to by the next state index as shown in FIG. 10.

FIG. 11 provides a visual representation of next state information in encoded control section 300 of memory as referenced by next state index 310. A count of next state transitions 316 contains a numerical value corresponding to the number of transitions to different states permitted from the current state. The count of next state transition is utilized to define the number of next state transition sets as indicated by the first next state transition through the last next state transition sets in FIG. 11. Upon reference being made to the memory location depicted as table 314 by next state index 310, each set of the next state transitions will be sequentially tested by comparing AND condition vector 320 to the input register vector to determine if a corresponding next state transition is to be made. A count 318(A) of AND conditions for the set of first state transitions is stored in order to permit a variable number of AND conditions for each state in order to minimize memory allocation. The next state vector 322(A) provides an address identifying the location in memory of the state to which the transition is to be made. Corresponding sets of state transition information exists for each possible next state transition. The last next state transition set is represented by elements 318(N), 320(N), and 322(N) which each provide corresponding functions as previously explained. If, after processing all of the AND conditions associated with all of the sets of next state transitions indicated in table 314 and determining that none of the AND conditions are satisfied, this results in a NO determination by state transition step 200 as shown in FIG. 8. If one of the AND vector conditions is TRUE, then the next state transition step 200 decision is "YES" and leads to a transition to the next state indicated in the corresponding vector 322 of table 314. Thus, it will be apparent that the number of AND vectors associated with each next state transition set may vary in number, thereby eliminating the need for a uniform fixed number of vectors for each set as required in accordance with the prior art implementation.

Figure 12:
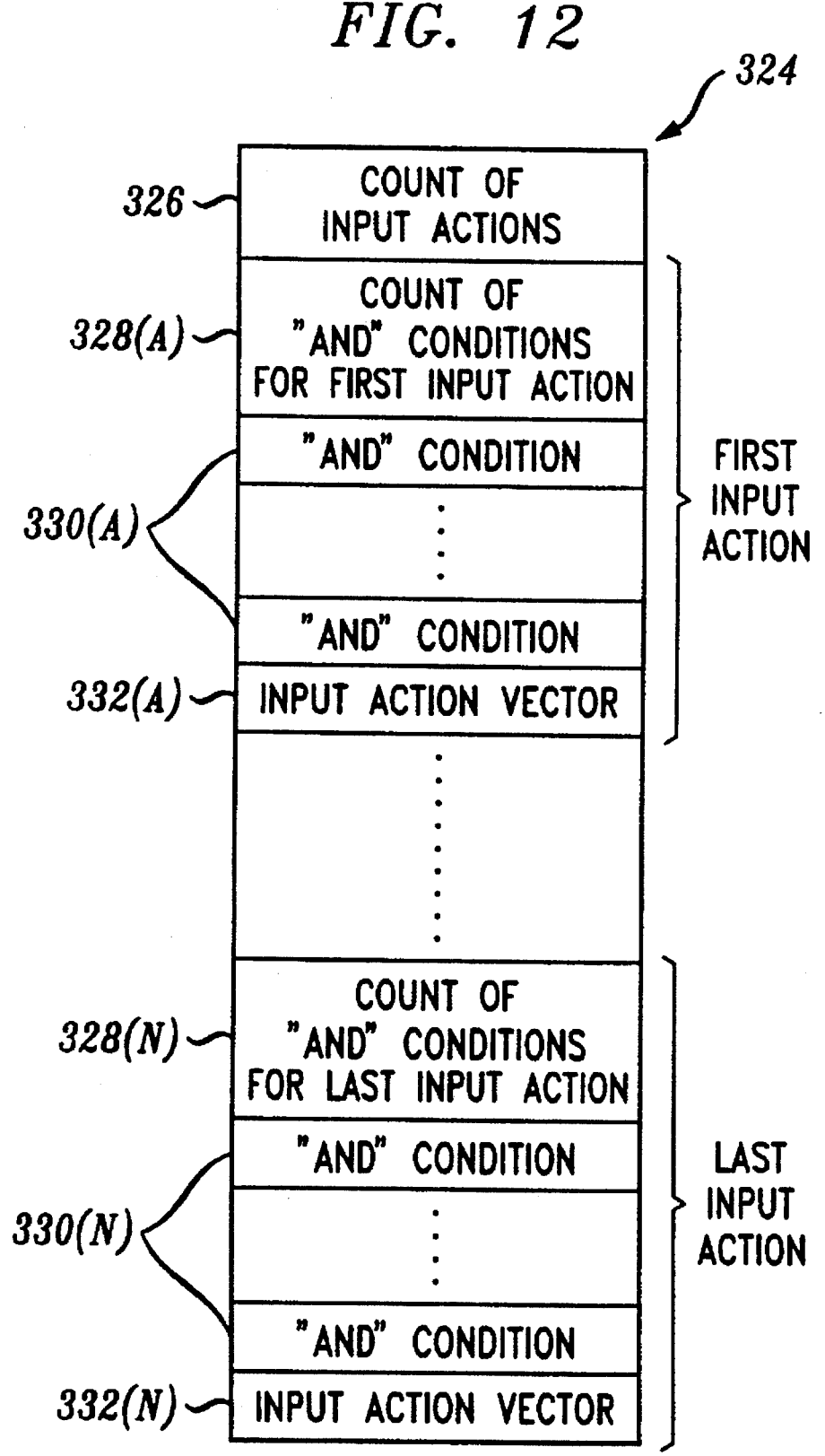
FIG. 12 is a table representative of memory storage of input action logic as associated with the input action index of FIG. 10.

FIG. 12 illustrates a table 324 of input action information for a given state stored in memory and referenced by input action index 308. Generally, the table 324 is similar to that previously explained for table 314 except that table 324 corresponds to similar functions for the first input action as opposed to the next state transition. A count 326 of the sets of input actions available for this state is stored in table 324. For each of the sets of input actions, a count 328(A) of the number of AND conditions (vectors) for the input actions is stored. This provides encoding control to determine the number of following AND condition vectors 330(A) to be tested. An input action vector 332(A) is associated with each input action set, and corresponds to an input action vector 128 of FIG. 6 which is utilized to be written to the output register. The last input action set contains corresponding elements, i.e. a count 328(N) of the number of AND conditions for the last input actions, the AND condition vectors 330(N) and a corresponding input action vector 332(N). The memory information represented by table 324 is located by the corresponding input action index 308 which in turn is accessed upon a request for a processing input action by step 204 of FIG. 8. If one of the AND condition vectors represented in table 324 is TRUE when compared with the vector of the input register, the corresponding input action vector will be executed and processing of other sets of input actions continues until all sets have been evaluated; control then passes to next state transition step 200.

The advantage of this implementation can be better understood by referencing table 100 of FIG. 6 and noting that two blank vectors associated with the input action specifications of the prior art would have no memory allocated in accordance with the present invention, since a variable number of AND vectors can be accommodated as explained with regard to FIG. 12. Thus, the use of memory is minimized and processing speed in accordance with the present invention is increased by preventing the processing of blank vectors which will result in no meaningful information.

Figure 13:
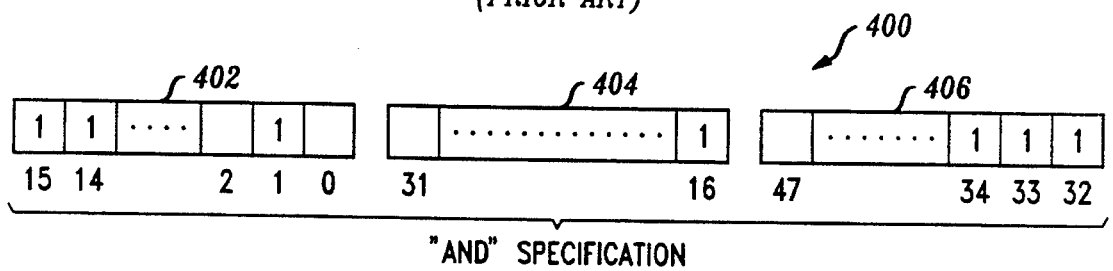
FIGS. 13 and 14 illustrate prior art AND specification vectors as defined in accordance with the application logic table representing a prior art finite state machine.

FIG. 13 illustrates an AND specification 400 in accordance with prior art finite state machine implementation. The AND specification 400, in this illustrative example, consists of three 16-bit words 402, 404, and 406 which provide encoding for maximum of 47 different input conditions. It is applicants' understanding that the zero bit position in word 402 was utilized in the prior art implementation to denote whether the remainder of the specification contained any bits which were set. In the illustrative example, the words form an effective bit sequence from bit position zero in word 402 to the last bit position 47 in word 406.

Figure 14:
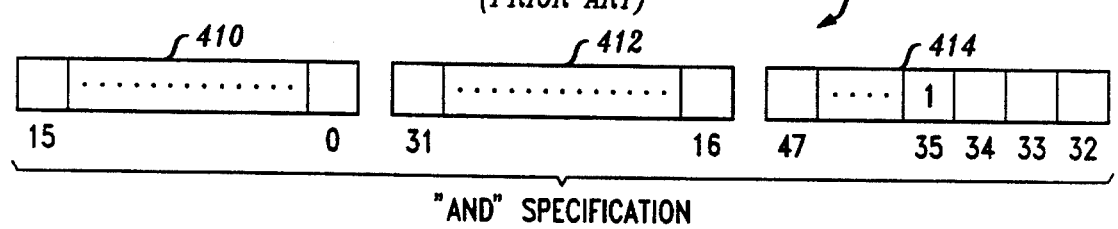

FIG. 14 represents another example of an AND specification 408 in accordance with a prior art implementation which again utilized three 16-bit words 410, 412, and 414. In this example, only a single bit, i.e. bit position 35 has a set bit. In accordance with the present invention, it has been discovered that a substantial number of vectors associated with the finite state machine in accordance with the present invention contains but a single set bit. The AND vector is tested by ANDing it with the input register vector using a bit-by-bit comparison. It will be apparent to those skilled in the art that none of the individual bit-to-bit ANDed comparisons can result in a TRUE condition except for the ANDing of the corresponding 35th bit with the AND specification with the 35th bit in the input vector. It will be apparent that substantial processing cycles will be required in order to attempt bit-by-bit matches for the 47 comparisons which are required, even though the only possible TRUE comparison could result from a comparison of the 35th bits of the respective vectors.

Figure 15:
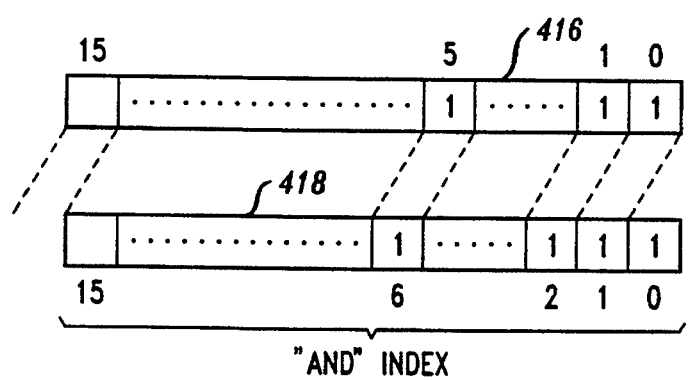
FIG. 15 illustrates an AND index vector utilized in accordance with the finite state machine of the present invention.

FIG. 15 illustrates the utilization of a single 16-bit word which forms an AND index that represents AND vector specifications having a single set bit. Word 416 represents a conventional 16-bit word in which the number 35 is encoded, i.e. binary bits 0, 1, and 5 are set. This represents the bit position 35 of an AND specification as shown in FIG. 14 in which only a single bit is set. Word 416 is left shifted by one bit to create another word 418. The zero bit position in word 418 is set and functions as a flag to indicate that a single 16-bit word is utilized to form a special AND index specification as opposed to a full length AND specification vector. If the zero bit is set, the implementation of the finite state machine in accordance with the present invention interprets the 16-bit word as containing a left shifted number representative of a single bit position to be tested relative to another full length vector such as the input register vector. The process interprets the word 418 as containing the number 35 (taking into account a 1-bit left shift). Then, the process identifies the corresponding bit location in the vector with which the comparison is to be made and makes a determination of whether the single bit position in the other vector is TRUE. A TRUE determination results in a TRUE determination of the corresponding AND specification; a FALSE indication indicates that the AND specification is not TRUE. The advantage in accordance with the present invention of utilizing an AND index instead of a conventional full length AND specification vector resides in minimizing the number of individual bit comparisons which must be made in order to yield a final decision. After an AND index 418 is recognized and interpreted, only a single bit position in the corresponding comparison vector need be analyzed to determine if the entire conventional AND specification is TRUE or FALSE. This minimizes the number of cycles and maximizes the execution speed of the finite state machine as implemented in accordance with the present invention.

It will be apparent to one skilled in the art that the use of this indexing technique can also be applied to the output control vectors, i.e. input action vectors, entry action vector, and exit action vector. For example, an input action vector having only a single set bit, such as vector 128 in FIG. 6, could be represented by an index vector that has the index flag set and stores the bit position of the set bit. Such an input action index would be used to directly identify the bit in the output register to be set.

Although an embodiment of the present invention has been described and illustrated in the drawings, the scope of the invention is defined by the claims which follow.

We claim:

1. In a microcomputer containing an implementation of a finite state machine (FSM) that controls a process wherein a plurality of input signals received by the FSM correspond to monitored process conditions and output signals generated by the FSM correspond to commands that effect changes in parameters associated with the process, the FSM having sets of selection vectors, and target vectors against which the sets of selection vectors are compared, logical data is selectively stored as binary bits in the selection vectors and target vectors, a method for minimizing time required by the microcomputer implemented FSM comprising the steps of:

a) selecting selection vectors having a single bit that is set, said selection vector having a bit position associated with said single bit, said selected selection vectors defining a first group of vectors and unselected selection vectors defining a second group of vectors;

b) generating for each of said selected selection vectors a corresponding index vector encoded with a flag and containing a binary number identifying the bit position of said single bit that was set;

c) replacing said selected selection vector with said index vector;

d) before comparing a target vector with one of said unselected selection vectors and index vectors, determining if said one vector contains said flag;

e) if said one vector contains said flag, utilizing said binary number contained therein to identify a bit position in the corresponding target vector to which the comparison is to be made;

f) if said one vector to be compared contains said flag, making a logical comparison by determining if said bit position in the target vector is TRUE, thus avoiding a bit by bit comparison of said target vector with said one vector and reducing the time required for such comparison.

2. The method according to claim 1 further comprising the step of:

if said one vector does not contain said flag, comparing said target vector and one vector by a bit to bit comparison to determine if a TRUE condition exists.

3. The method according to claim 1 wherein said comparing step further comprises comparing said target vector and an index vector solely by determining if said bit position in said target vector is TRUE.

4. In a microcomputer containing an implementation of a finite state machine (FSM) that controls a process wherein a plurality of input signals received by the FSM correspond to monitored process conditions and output signals generated by the FSM correspond to commands that effect changes in parameters associated with the process, the FSM having sets of selection vectors, and target vectors against which the sets of selection vectors are compared, logical data is selectively stored as binary bits in the selection vectors and target vectors, the improvement comprising:

means for selecting selection vectors having a single bit being set, said selection vector having a bit position associated with said single bit, said selected selection vectors defining a first group of vectors and unselected selection vectors defining a second group of vectors;

means for generating, for each of said selected selection vectors, a corresponding index vector encoded with a flag and containing a binary number identifying the bit position of said single bit that is set;

means for replacing said selected selection vector with said index vector;

means for determining if one of said unselected vectors and index vectors selected for comparison with a target vector contains said flag;

means, responsive to said one vector containing said flag, for utilizing said binary number contained therein to identify a bit position in the target vector;

means, responsive to said one vector containing said flag, for making a logical comparison by determining if said bit position in the target vector is TRUE, thus avoiding a bit by bit comparison of said target vector with said one vector, and reducing the time required for such comparison.

5. The microcomputer according to claim 4 further comprising means, responsive to said one vector not containing said flag, for comparing said target vector and one vector by a bit to bit comparison of said target vector with said one vector to determine if a TRUE condition exists.

6. The microcomputer according to claim 4 wherein said comparing means further comprises means for comparing said target vector and an index vector solely by determining if said bit position in the target vector is TRUE.

7. In a microcomputer containing an implementation of a finite state machine (FSM) that controls a process wherein a plurality of input signals received by the FSM correspond to monitored process conditions and output signals generated by the FSM correspond to changes to be made to parameters associated with the process, the FSM having sets of selection vectors, target vectors against which the sets of selection vectors are compared, and output action vectors that control the changes to be made to parameters associated with the process, logical data is selectively stored as binary bits in the selection vectors, target vectors, and output action vectors, a method for minimizing time required by the microcomputer implemented FSM comprising the steps of:

a) selecting output action vectors and selection vectors having a single bit that is set, said selected output action vectors and selection vectors having a bit position associated with said single bit;

b) for each of said selected vectors, generating a corresponding index vector encoded with a flag and containing a binary number identifying the bit position of said single bit that was set in the corresponding selected vector;

c) replacing said selected vectors with corresponding index vectors;

d) during execution of said implementation of the finite state machine, determining if a certain vector to be processed contains said flag;

e) if said certain vector contains said flag, utilizing the binary number contained in said certain vector to identify a bit position in said target vector associated with the processing of said certain vector;

f) if said certain vector contains said flag, logically processing said target vector based on whether said bit position in said target vector is TRUE, thus reducing the time required for processing said target vector relative to said certain vector.

8. The method according to claim 7 wherein said comparing step further comprises processing said target vector relative to said certain vector based solely on the determination of whether said bit position in the another vector is TRUE.

* * * * *